C. J. PATTERSON.
METHOD OF MIXING DOUGH.
APPLICATION FILED MAR. 15, 1918.
1,279,143.
Patented Sept. 17, 1918.
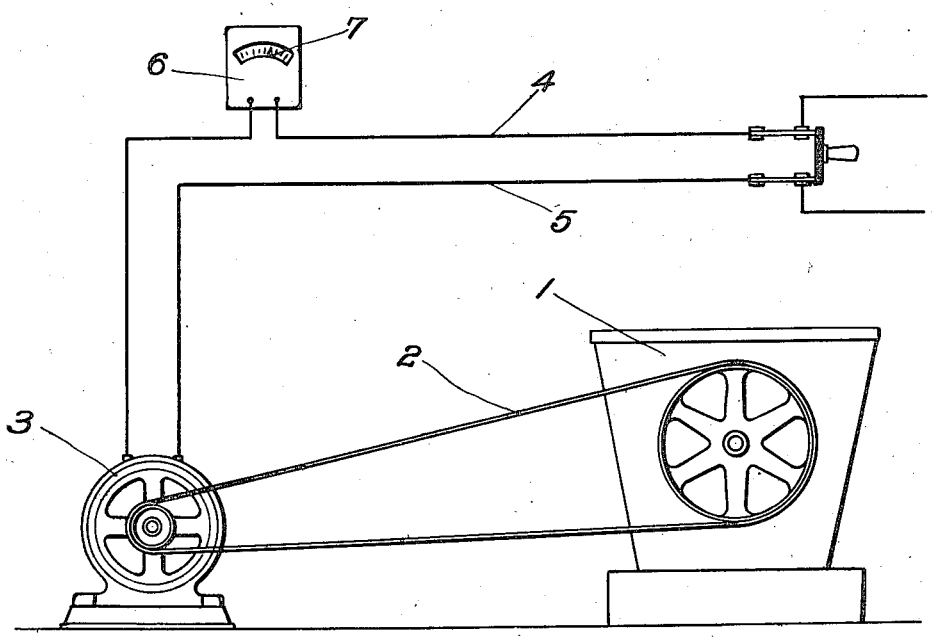
INVENTOR.
Curtis J. Patterson.
BY
ATTORNEY.

UNITED STATES PATENT OFFICE.

CURTIS J. PATTERSON, OF KANSAS CITY, KANSAS.

METHOD OF MIXING DOUGH.

1,279,143.   Specification of Letters Patent.   Patented Sept. 17, 1918.

Application filed March 15, 1918. Serial No. 222,699.

*To all whom it may concern:*

Be it known that I, CURTIS J. PATTERSON, a citizen of the United States, residing at Kansas City, in the county of Wyandotte and State of Kansas, have invented certain new and useful Improvements in Methods of Mixing Dough; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to the mixing of dough and has for its principal object to provide means and a method whereby dough batches mixed from flour of different grades or kinds may in each case be mixed to a certain standardized degree of consistency.

It is also an object of the invention to provide means for determining the certain proportional amounts of water and flour of the different grades or kinds necessary in order that when mixed, a dough of such standardized consistency will be formed.

To those familiar with mixing dough, it is known that different kinds or grades of flour, *i. e.*, flours that differ in the degree of fineness to which they are ground or in the proportions of their constituents, require larger or smaller proportional amounts of water to certain measurements of flour in order that when mixed, the dough batches will all have the same degree of consistency, and it has been found by experiment that a certain adopted type of mixing machine requires a certain definite amount of power for its operation when the dough being mixed thereby has this desired consistency.

With these facts in mind I have provided an arrangement of apparatus whereby the exact amount of power being exerted in driving a mixing machine may be indicated at all times so that when the indicator shows that a certain amount of power, that has previously been found by experiment is required to operate the mixing machine when the dough has a desired consistency, is being used, it will be known to an observer that the right proportion of flour and water are being used and the dough will have the desired consistency.

In accomplishing the object of the present invention I have provided the arrangement in the accompanying drawing, wherein:—

1 designates a dough mixing machine of an adopted type, which is driven by a suitable driving connection, here shown to be a belt 2, from an electric motor 3; the motor being connected with electric circuit wires 4—5 and the wire 4 having an ammeter 6 interposed therein whereby the amount of current or the number of amperes of current flowing through the motor circuit at any time is shown by direct reading on the ammeter scale 7.

In using the apparatus, flour and water are placed in the mixer 1 and the motor started by closing an electric circuit therethrough to operate the mixing apparatus. After a certain amount of mixing has been done the operator notes the reading of the ammeter, and if it shows a greater amount of current is being used than by previous experiment has been found to be necessary to operate the machine when the dough has the required consistency, he will know that the dough is too stiff and needs to be thinned so that the mixer will be more easily operated. He then accordingly adds more water until the ammeter shows that only the predetermined amount of current is being used.

If on reading the ammeter the operator finds that less current than the designated amount is being used, he knows that the dough is too thin, and he accordingly adds flour, until the reading on the ammeter scale shows that the exact amount of power or current is being used.

With the device so arranged it is apparent that, no matter what the grade of flour being used may be, dough of the same consistency will be mixed by properly proportioning the amounts of flour and water used which is determined by observing the readings of the ammeter.

Having thus described my invention, what I claim as new therein and desire to secure by Letters-Patent, is:—

1. The method of mixing dough consisting of stirring flour and water by a mechanical motor, measuring the power used by the motor and adding flour or water until the power measurement indicates a stiffness or consistency required for a given grade or kind of flour.

2. The method of mixing dough consisting of stirring flour and water by an electrically operated motor, measuring the electric current used by the motor and adding flour or water until the power measurement indicates a stiffness or consistency required for a given grade or kind of flour.

3. The method of mixing pulverulent material and a fluid together to form a plastic mass which consists of utilizing a motor for the power medium of the stirrer and measuring the energy of the motor to determine the consistency of the mass.

4. The method of mixing pulverulent material and a fluid together to form a plastic mass which consists in utilizing an electric motor for the power medium of the stirrer and measuring the electric current used by the motor and adding one of the ingredients until the power measurement indicates the required consistency.

In testimony whereof I affix my signature.

CURTIS J. PATTERSON.